United States Patent [19]

Bidol

[11] Patent Number: 4,596,318

[45] Date of Patent: Jun. 24, 1986

[54] SPLIT SHELL CALIPER PIN ASSEMBLY AND DISC BRAKE

[75] Inventor: Michael K. Bidol, Dearborn Heights, Mich.

[73] Assignee: Ford Motor Company, Dearborn, Mich.

[21] Appl. No.: 559,989

[22] Filed: Dec. 9, 1983

[51] Int. Cl.[4] ............................................. F16D 65/00
[52] U.S. Cl. ............................ 188/73.45; 37/142 A; 403/378
[58] Field of Search ............... 188/73.44, 73.31, 73.32, 188/73.34, 73.45, 73.39, 73.33, 73.35–73.38; 403/378, 379; 37/142 A

[56] References Cited

U.S. PATENT DOCUMENTS

| 2,754,716 | 7/1956 | Bourns | 37/142 A |
|---|---|---|---|
| 2,987,332 | 6/1961 | Bonmartini | 37/142 A |
| 2,991,569 | 7/1961 | Launder | 37/142 A |
| 3,616,876 | 11/1971 | Brooks | 188/73.45 |
| 3,782,508 | 1/1974 | Cook | 188/73.35 |
| 3,805,925 | 4/1974 | Schoenhenz | 188/73.45 |
| 4,049,086 | 9/1977 | Rath | 188/73.36 |
| 4,087,928 | 5/1978 | Mickus | 37/142 A |
| 4,265,340 | 5/1981 | Scott et al. | 188/73.44 |
| 4,310,075 | 1/1982 | Johannesen et al. | 188/73.35 |
| 4,318,458 | 3/1982 | Ritsema | 188/73.44 |
| 4,331,221 | 5/1982 | Evans et al. | 188/73.44 |
| 4,436,187 | 3/1984 | Bolenbaugh et al. | 188/73.45 |

FOREIGN PATENT DOCUMENTS 2250742 4/1974 Fed. Rep. of Germany ... 188/73.36

*Primary Examiner*—Bruce H. Stoner, Jr.
*Assistant Examiner*—Michael P. Gilday
*Attorney, Agent, or Firm*—Peter D. McDermott; Roger L. May

[57] ABSTRACT

A radially resilient caliper pin assembly for slideably mounting a disc brake caliper to a torque member comprises an elastomeric core and two preferably metal shell members bonded to the elastomeric core to form a split-shell case about the elastomeric core. The shell members each provide substantially flat outer surfaces adapted to lie against corresponding surfaces of the caliper pin receiving way.

10 Claims, 9 Drawing Figures

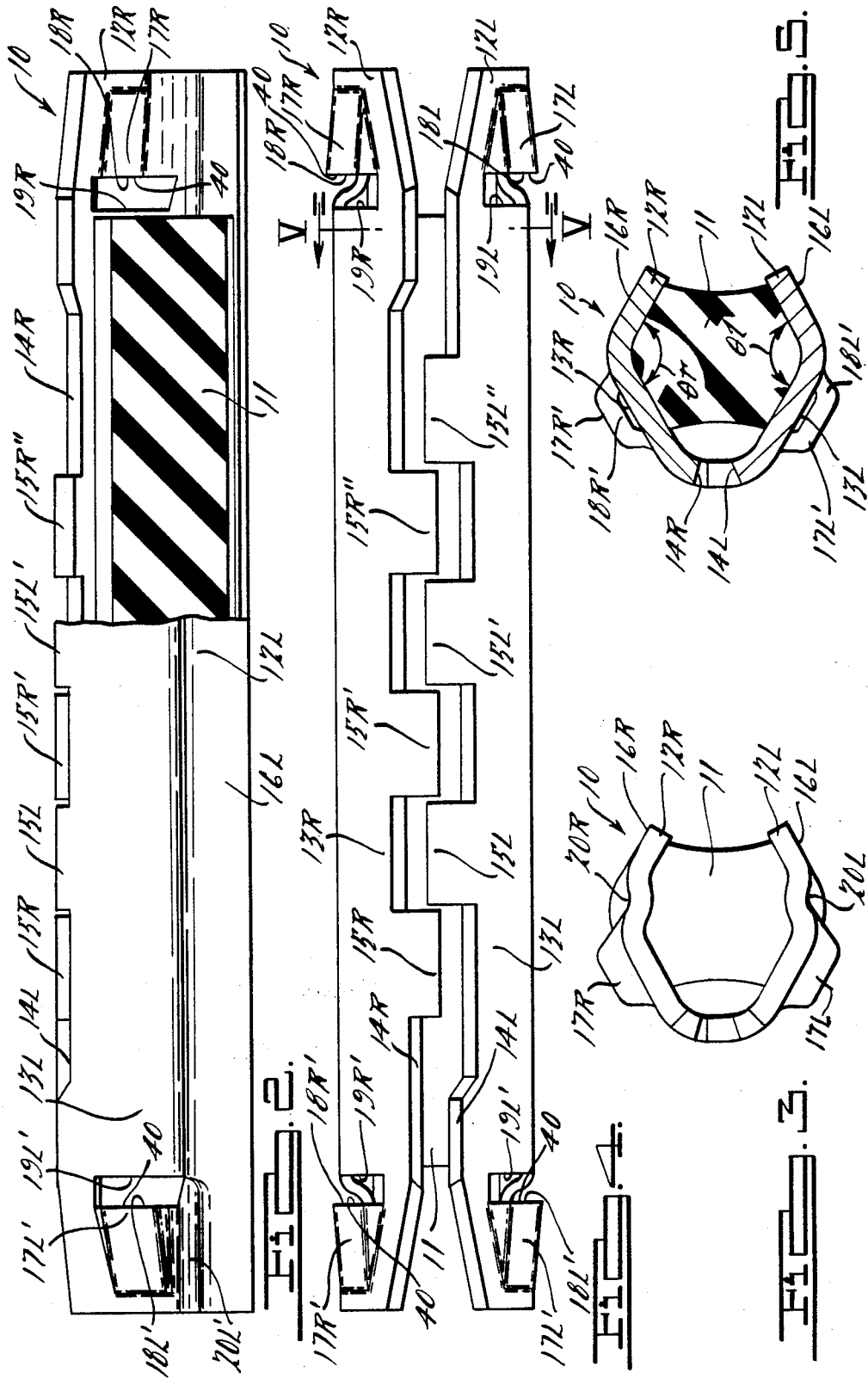

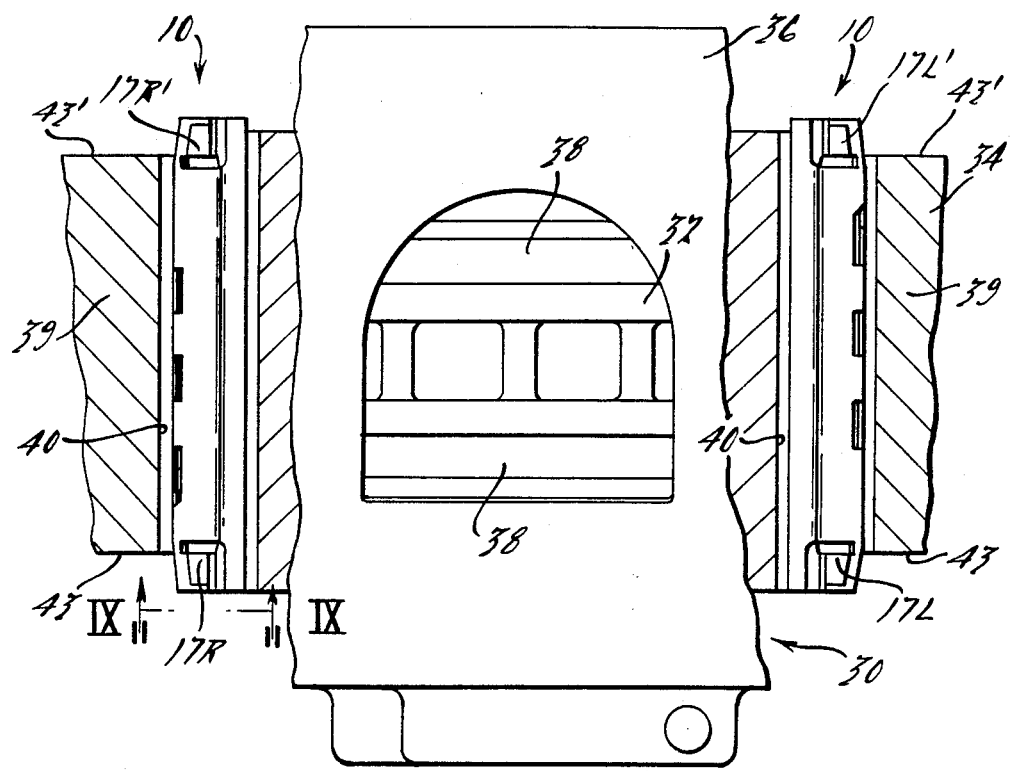
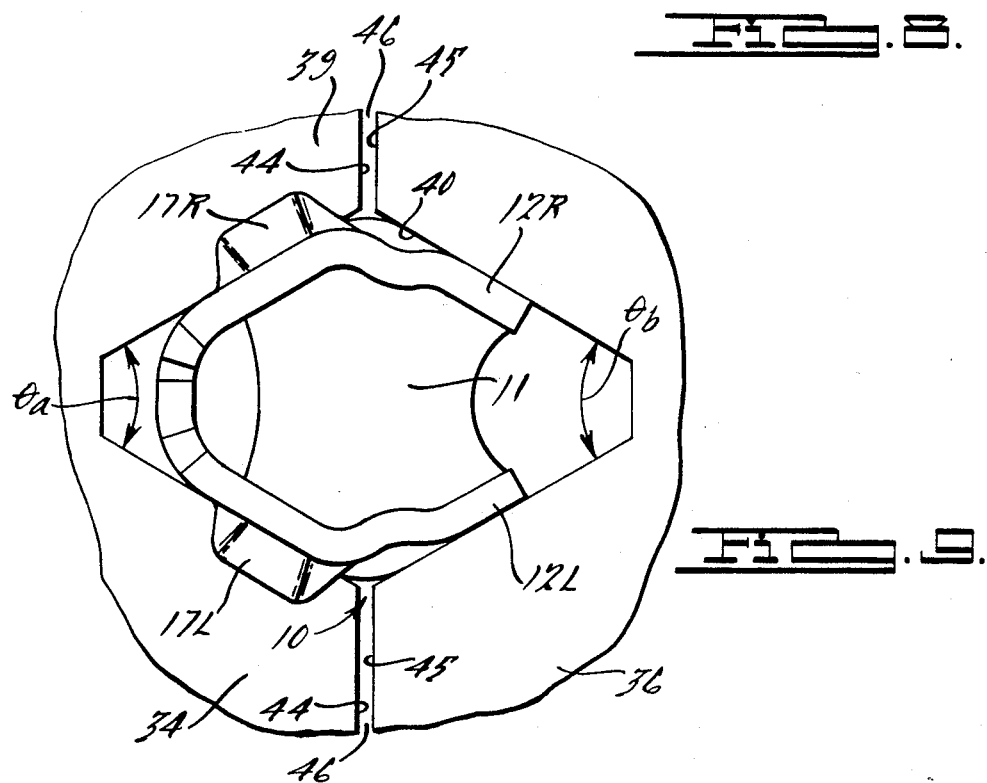

SPLIT SHELL CALIPER PIN ASSEMBLY AND DISC BRAKE

TECHNICAL FIELD

This invention relates to a caliper pin assembly for a disc brake and, more particularly, to a caliper pin assembly adapted to mounting a caliper onto a torque member.

BACKGROUND OF THE INVENTION

Floating calipers for disc brakes are known to have advantages over nonfloating calipers. The opposing sides of a floating caliper and a torque member need not be machined smooth since the caliper does not slide against the torque member. However, a guide and retention mechanism must be employed to retain the caliper in position between the two arms of the torque member and to guide the caliper when the disc brake is actuated. Commonly, a caliper pin assembly is interposed between the caliper and each arm of the torque member.

In certain floating caliper disc brake assemblies torque experienced by the caliper is transferred through the caliper pin assembly to the torque member. Consequently, the caliper pin assembly must be sufficiently strong and durable to withstand such torque transfer. In preferred floating caliper disc brake assemblies, torque is transferred from the caliper directly to the torque member, by-passing the caliper pin assembly. Such direct torque transfer requires that the caliper pin assembly be deformable such that the caliper is able to make direct contact with the torque member. Known deformable caliper pin assemblies generally have exterior elastomeric bushings which are subject to excessive wear caused by the sliding motion of the caliper against the bushing. Other such deformable pin assemblies are difficult to assemble within the confined space provided between the torque member and the caliper.

It is an object of the present invention to provide a caliper pin assembly which is durable and yet easy to install while maintaining the known advantages of a floating caliper disc brake.

SUMMARY OF THE INVENTION

The present invention provides a caliper pin assembly and a disc brake assembly comprising such caliper pin assembly. The disc brake assembly of the present invention comprises a rotor, a torque member positioned adjacent the rotor, a caliper and two caliper pin assemblies moveably mounting the caliper between two arms of the torque member. The caliper mounts friction elements for engagement with the rotor upon actuation of the disc brake assembly. Each arm of the torque member provides a channel and the caliper provides two channels, one opposing each of the two torque member arm channels, to form two noncircular ways for receiving (one each) the aforesaid caliper pin assemblies.

The caliper pin assembly of the invention is deformable, more specifically, it is radially resilient. It comprises an elongate elastomeric core, which preferably is substantially solid, and two substantially rigid elongate shell members bonded to the elastomeric core substantially parallel to one another to form a splitshell case about the elastomeric core. Preferably, each of the shell members has a substantially flat upper surface portion and a longitudinal upper edge adjacent and generally parallel to the longitudinal upper edge of the other shell member. Each shell member preferably also has a substantially flat lower surface portion forming an obtuse inner angle with the aforesaid first surface portion about a line parallel the longitudinal axis of the caliper pin assembly.

The caliper pin assembly is resiliently flexible from an unflexed first position to a radially contracted or deformed second position. In such deformed second position, the caliper pin assembly is sized to fit within a noncircular way formed by opposing channels in the caliper and torque member arm. The caliper pin assembly preferably is sized and sufficiently deformable to permit direct contact of the caliper to the torque member such that torque can be transferred directly from the caliper to the torque member.

BRIEF DESCRIPTION OF THE DRAWINGS

Reference now will be made to the accompanying drawings in which:

FIG. 2 is a side elevational view, partially broken away of the caliper pin assembly of FIG. 1;

FIG. 3 is an end view, from front or back, of the caliper pin assembly of FIG. 1;

FIG. 4 is a plan view of the caliper pin assembly of FIG. 1;

FIG. 5 is a cross-section view taken along the lines of V—V in FIG. 4;

FIG. 8 is a plan view, partially broken away and partially diagramatic, of the disc brake assembly of FIG. 7; and FIG. 9 is an enlarged cross-sectional view taken along line IX—IX in FIG. 8.

DETAILED DESCRIPTION OF THE PREFERRED EMBODIMENT

Figure 1:
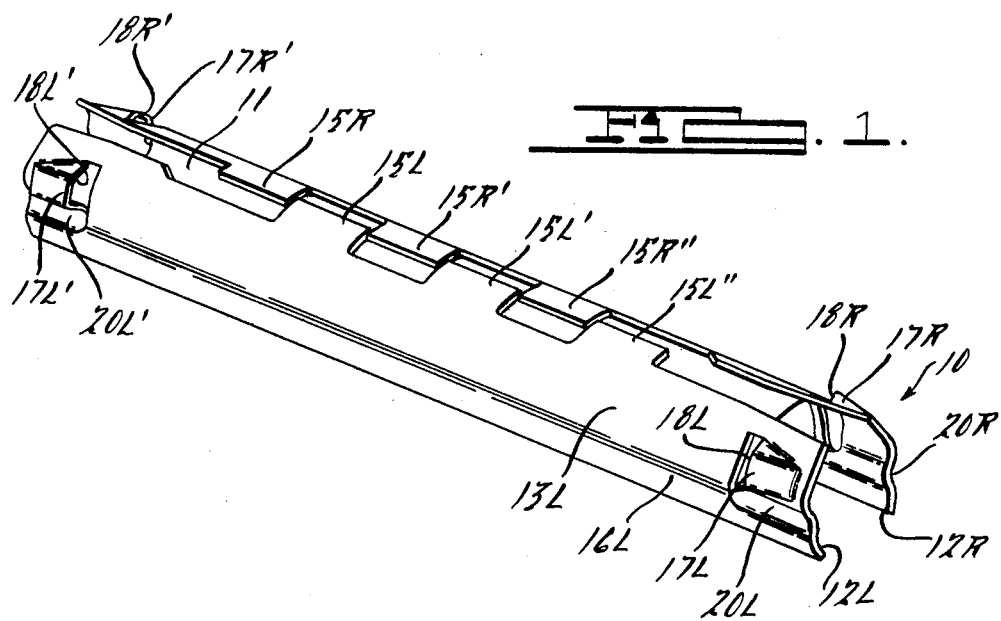
FIG. 1 is a prespective view of a caliper pin assembly according to a preferred embodiment of the invention.

Referring to FIGS. 1-5, a caliper pin assembly 10 comprises an elongate elastomeric core 11 and two substantially rigid, preferably metal, elongate shell members 12R, 12L bonded longitudinally to the elastomeric core, substantially parallel to one another. The two shell members form a split-shell case about the elastomeric core. Each of the shell members has a substantially flat, upper elongate outer surface portion 13R, 13L and a longitudinal upper edge 14R, 14L. The upper edges are adjacent to each other and generally parallel to the longitudinal axis of the caliper pin assembly. According to a preferred embodiment, for reasons discussed below, longitudinal upper edges 14R, 14L each forms one or more axially interspaced teeth, the one or more teeth of each being interemeshed with the one or more teeth of the other. The teeth of one shell member, however, are not integral with those of the other shell member. Rather, each of the two shell members is connected to the other preferably only indirectly through the elastomeric core 11. Intermeshing teeth 15R, 15R', 15R", 15L, 15L' and 15L" are shown most clearly in FIGS. 1, 2 and 4. The two shell members each has a second substantially flat elongate outer surface portion, that is, a lower surface portion 16R, 16L. Each shell member forms an obtuse inner angle $\theta_r$, $\theta_l$ about a line substantially parallel to the longitudinal axis of the caliper pin assembly.

According to the preferred embodiment shown in the drawings, the caliper pin assembly provides one or more retention tabs to fix the longitudinal position of the caliper pin assembly in the disc brake assembly. Referring again to FIGS. 1–5, radially outward extending retention tabs 17R, 17R', 17L, 17L' are shown. Each retention tab is seen to be located at an axial extremity of the shell members 12R and 12L and each presents an abutment surface 18R, 18R', 18L, 18L' preferably substantially orthogonal to the longitudinal axis of the caliper pin assembly. Thus, unlike most caliper pin assembly designs known to those skilled in the art, the present invention does not require the use of a nut and bolt or other redundant retention means. This provides significant reduction in assembly complexity and cost.

According to a preferred embodiment of the present invention, the two shell members forming the split-shell case about the elastomeric core are substantially identical. That is, as seen in the preferred embodiment illustrated in the drawings, the right side and left side shell members are identical in size and shape. Thus, only a single shell member need be designed and manufactured and there is a significant reduction in assembly complexity for the caliper pin assembly since the possibility of mistaken substitution of one side shell member for the other is eliminated. In addition, according to the preferred embodiment shown in the drawings, the caliper pin assembly has such configuration that it is substantially identical as viewed along its longitudinal axis from either end. Thus, the caliper pin assembly is bi-directional and can be inserted in either direction into the disc brake assembly discussed below. This provides an obvious reduction in assembly time, complexity and cost.

The retention tabs preferably are given a configuration which permits easy installation and removal of the caliper pin assembly. Specifically, for example, as shown in the drawings, the retention tabs can present a ramped surface towards the adjacent end of the shell member. The retention tab can also provide rounded or chamfered edges 40 to ease passage of the caliper pin assembly within the receiving way in the disc brake assembly into which it is inserted. In addition, preferred embodiments of the invention, as shown in the drawings, provide slots immediately axially inward of the retention tabs, which slots are suitable to receive a screwdriver or like leveraging device to effect removal of the caliper pin from the disc brake assembly. Referring to FIGS. 2 and 4, removal slots 19R, 19R', 19L, 19L' are shown. It will be immediately apparent to those skilled in the art in designing a caliper pin assembly according to the present invention, that the axial spacing between retention tabs must be at least marginally greater than the axial dimension of the corresponding section of the receiving way. This will allow insertion of a screwdriver or like device into the slot, whereby the caliper pin assembly can be pried out of the receiving way. Detents 20R, 20R' (not shown), 20L, 20L' are provided in the shell members at each end of the caliper pin assembly according to such preferred embodiment, whereby needle nose pliers or like device can be used to compress one end of the caliper pin assembly. Accordingly, the caliper pin assembly is compressed at one end to fit the retention tabs into the receiving way and a screwdriver or like device employed at the other end to pull or pry the caliper pin assembly partially out of the receiving way. Once started, a drift pin or like device is used to complete removal.

The cross-sectional shape of the caliper pin assembly and that of the receiving way formed by the spindle (i.e., torque member) 34 and the caliper 36 are correspondingly non-circular so as to fix the orientation of the caliper pin within the receiving way. Preferably, the caliper pin is oriented such that the retention tabs of the caliper pin abut against the spindle, as illustrated in FIG. 9. Thus, preferably, each of the above-described substantially flat exterior surface portions of the shell members is positioned in surface-to-surface contact with a corresponding substantially flat surface forming the receiving way of the brake assembly. This reduces the contact stresses between the caliper pin and the receiving way. It also reduces contamination of the contact area by inhibiting the infiltration of dirt and thus reduces wear of the contacting surfaces.

The inner angle formed about the longitudinal axis of the caliper pin assembly by the upper and lower portions of the shell members will affect compressability of the caliper pin assembly. Such angle $\theta_r$, $\theta_l$ is suitably from about 90°–135°, preferably about 120°. The angle of intersection $\theta_a$ (FIG. 9) of the upper portions of the two shell members preferably is substantially equal to the angle of intersection $\theta_b$ of the lower portions of the two shell members. Such angles of intersection are preferably about 45°–75°, most preferably about 60°, since this has been found both to maintain well the proper orientation of the caliper pin assembly within the receiving way of the disc brake assembly and to provide good compression characteristics to the caliper pin assembly. It will be obvious from the foregoing discussion that the angle of intersection of the substantially flat surfaces provided by the torque member to form one side of the receiving way in the disc brake assembly should be approximately the same as the angle of intersection of the upper portions of the two shell members, i.e., most perferably about 60°. It also follows that the angle of intersection of the substantially flat surfaces provided by the caliper to form the other half of such receiving way preferably is the same, also about 60°.

Preferably the caliper pin is somewhat oversized, that is, somewhat larger than the receiving way in the disc brake assembly with the brake not being actuated, such that the caliper pin is somewhat compressed in the receiving way. The caliper pin assembly is preferably sized to provide sufficient expansive force against the surfaces of the receiving way to prevent rattling of the caliper in the disc brake assembly. Preferably, for example, the caliper pin is installed under compression. Of course, excessive compressive load would inhibit insertion and removal of the caliper pin assembly and could prevent sufficient further compression of the caliper pin to enable direct contact between the caliper and the torque member.

The shell members preferably are made of heavy gage, heat treated stainless steel such as, for example, 0.04 inch thick 410 stainless steel. Preferably, the shell members are sufficiently durable to withstand repeated impact with sufficient force to effect the installation and removal of the caliper pin assembly one or more times. In this regard, the aforementioned intermeshing teeth of the shell members function to distribute and equalize forces applied to the caliper pin assembly during its installation and removal. That is, force applied to either shell member is transmitted to the other via the intermeshing teeth. Alternative metals and other materials suitable for a given application will be apparent to those skilled in the art in view of the present disclosure. The shell members can be stamped, which is preferred, or formed by any other suitable means.

The spring rate of the caliper pin assembly is determined almost exclusively by the size and properties of the elastomeric core. For this reason the spring rate and other physical properties of the caliper pin assembly of the invention is easily and precisely controllable. While any elastomeric material may be suitable for a given application, for a disc brake assembly for a passenger vehicle it has been found that natural rubber is a preferred elastomeric core material. Natural rubber is found to provide excellent creep resistance, that is, resistance to loss of compressive resiliency over extended use. The shape and size of the rubber cross-section is designed to provide suitable deflection and compression properties for a given application. Thus, the durometer of the elastomeric material and the other properties thereof can be selected to provide suitable stiffness, creep control, aging resistance, etc. for the intended application.

There are several alternative approaches to the manufacture and assembly of the caliper pin and this is not a critical feature of the invention. Thus, for example, the rubber in the pin may be extruded and the two shell members adhesively bonded to the surface thereof. Alternatively, the elastomeric core can be injection molded directly into the shell members. Alternatively, the elastomeric core can be injection molded on-the-halfshell and the two molded halves then adhesively bonded together.

In regard to the disc brake assembly aspect of the present invention, reference is made to FIGS. 6-9. Disc brake assembly 30 is shown to include a rotor 32, a stationary torque member (spindle) 34, and a caliper 36. The caliper 36 straddles the rotor 32 and has mounted thereto two brake pads 38 that are frictionally engageable to each side of the rotor. The caliper 36 is slidably mounted to two arms 39 of the torque member 34 via two caliper pin assemblies 10 as disclosed above.

The two caliper pin assemblies used in the disc brake assembly 30 preferably are identical and the two receiving ways of the disc brake assembly also preferably are identical. Accordingly, hereinafter only one pin assembly and one receiving way are referred to unless otherwise indicated.

Figure 7:
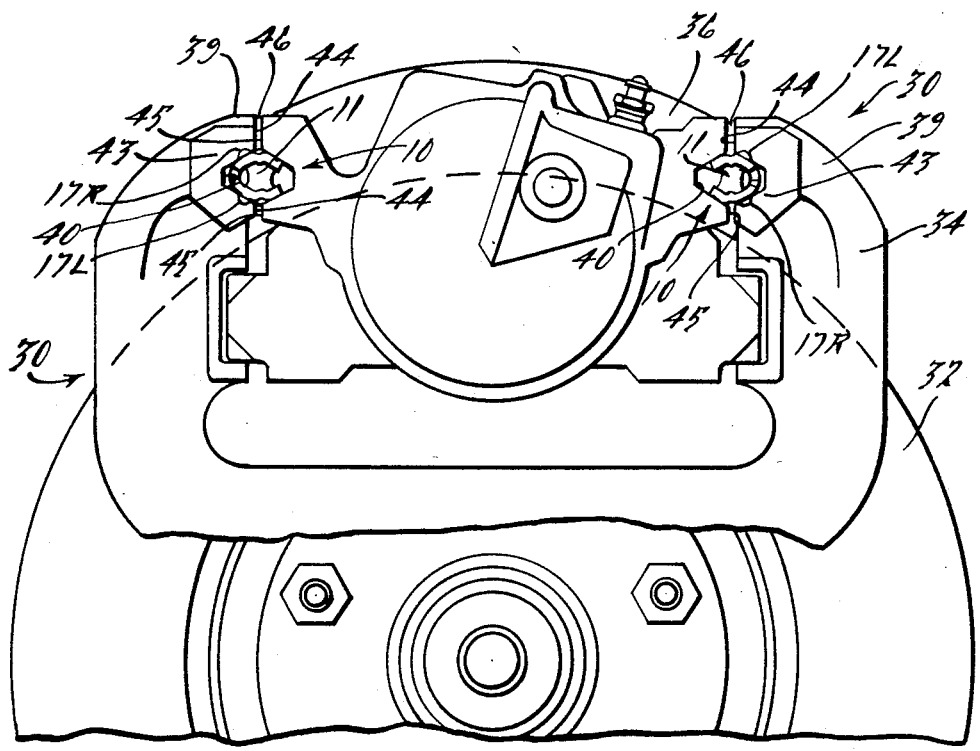
FIG. 7 is a side elevational view, partially broken away, disclosing a disc brake assembly according to a preferred embodiment of the invention, comprising the caliper pin assembly of FIG. 1.
Figure 6:
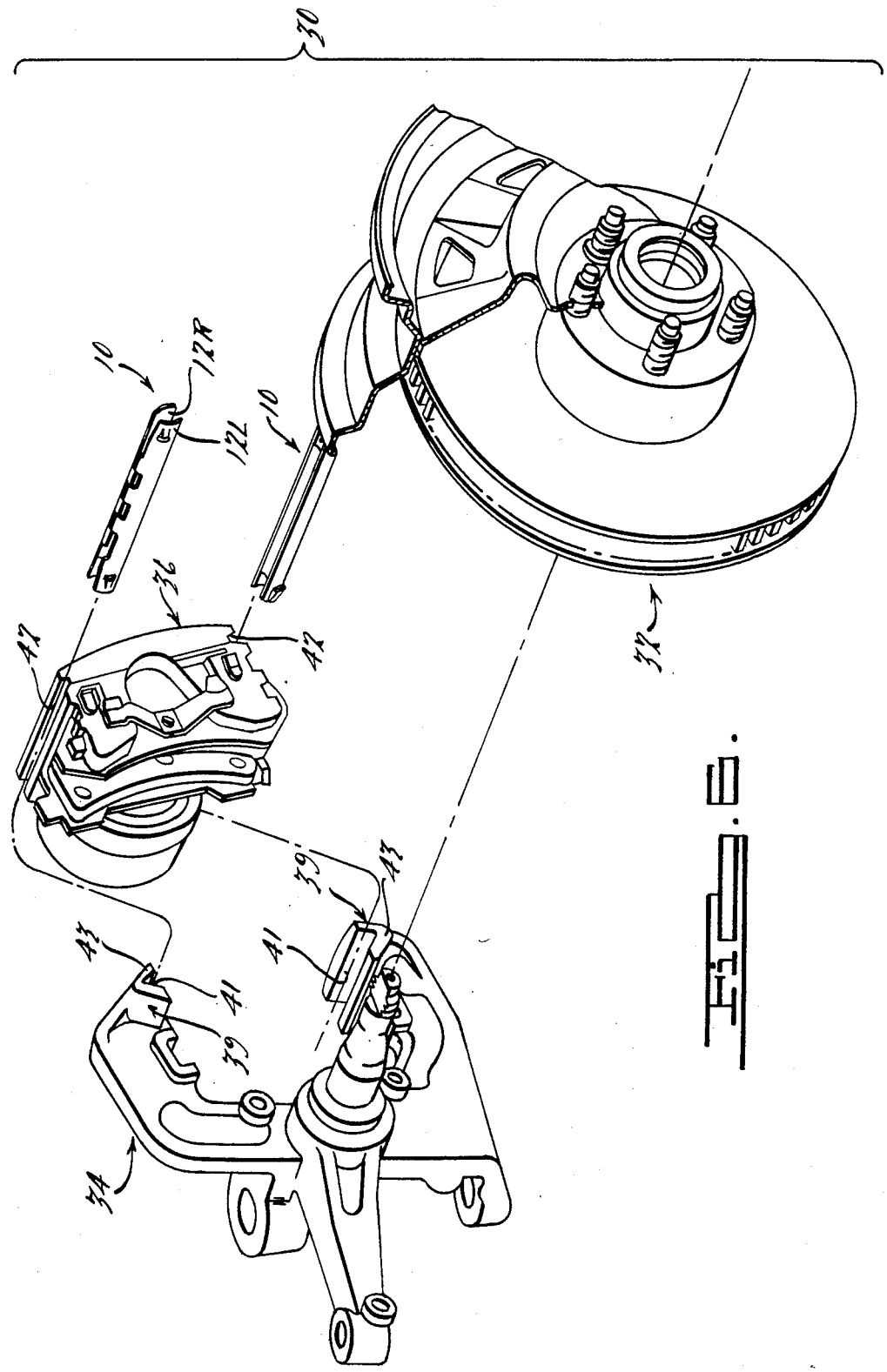
FIG. 6 is a exploded perspective view, partially broken away and partially diagramatic, of a disc brake assembly according to a preferred embodiment of the invention, comprising the caliper pin assembly of FIG. 1.

Aperture 40 forms a receiving way into which caliper pin assembly 10 is inserted. Aperture 40 is formed by an open channel 41 in torque member arm 39 and a corresponding open channel 42 in caliper 36, as shown in FIG. 6. When the caliper pin is within aperture 40, as shown in FIGS. 7, 8 and 9, the retention tabs 17R, 17R', 17L, 17L' abut walls 43, 43' of torque member arm 39. In addition, the substantially flat surface portions of the shell members of caliper pin assembly 10 are seen in FIGS. 7 and 9 to lie substantially flat against corresponding surfaces of the open channel 41 and open channel 42 forming aperture 40. Accordingly, caliper pin assembly 10 is prevented from rotating within aperture 40 and is limited as to axial movement therein.

As shown in FIGS. 7 and 9, when both caliper pin assemblies are installed, the opposing surfaces 44 and 45 of torque member 34 and caliper 36, respectively, are spaced apart to form a gap 46 therebetween. Thus, the caliper 36 floats between the two torque member arms 39 in substantially constant contact with the caliper pin assemblies. If the caliper and torque member undergo a vibration, the caliper pin assemblies each expand and contract as needed to maintain contact with the caliper and with the torque member such that in most instances rattling is prevented. That is, once installed the caliper pin assembly remains resiliently contractable, and the resiliency of each caliper pin is sufficient to effectively oppose most inertial motion of the caliper. The inertial motion of the caliper merely compresses or allows the expansion of one or the other of the caliper pin assemblies.

Upon actuation of the disc brake, the caliper slides against the caliper pin and does not initially contact or slide against the stationary torque member. The caliper, reacting to brake torque, compresses a caliper pin until the surface 44 of torque member 34 abuts the surface 45 of the caliper 36. The abutment of the caliper to the torque member provides a direct transfer of braking torque from the caliper to the torque member, bypassing the caliper pin assembly. When one caliper pin assembly is radially contracted due to the decreased lateral dimensions of its receiving way (aperture 40), the other caliper pin assembly radially expands to fill the corresponding increase in lateral dimensions of its receiving way. Upon decrease in the braking torque due to a slowing of the rotor 32 or deactuation of the brakes, the caliper returns to its original position and the two caliper pin assemblies return to their original shape and dimensions.

The caliper pin assembly of the present invention and the disc brake assembly comprising same provide multiple advantages and are a significant advance in the art. The non-circular configuration prevents pin rotation during use and thus ensures the effectiveness of another advantageous aspect of the invention, specifically the retention tabs which can be formed integrally with the shell members. In addition, the flat surfaces of the shell members reduce the contact stresses between the caliper pin assembly and the surfaces of the receiving way. The planar surface contact also reduces the likelihood of contamination within the contact area and thus reduces wear of the contacting surfaces.

According to the preferred embodiments discussed above, the caliper pin assembly is bi-directional, that is, it can be installed either end first and from either side of the receiving way. Further, the caliper pin assembly of the invention can be reusable and for this purpose preferably provides detents and screwdriver slots as discussed above. Also according to a preferred embodiment, the caliper pin assembly provides a set of intermeshing teeth which maintains alignment of the shell members with one another and distributes forces from one to the other during installation and use.

The two piece metal case, i.e., the split-shell case, virtually eliminates the case deformation stresses experienced by a caliper pin of the one-piece case type. This permits the use of a less expensive stainless steel for the case members. Since the metal pieces are of simple shape, they are easy to form and control dimensionally. Furthermore, according to the present invention the case spring rate is virtually eliminated as a significant consideration in the design of the caliper pin. Thus, the caliper pin assembly is easily designed to obtain the desired deflection and compression properties for a given application since the elastomeric durometer and other properties are selected as a matter of routine skill to provide the desired stiffness, creep control, aging resistance, etc. compatable with the given application. In addition, in view of the present disclosure, the shape and size of the elastomeric core can be easily designed by those skilled in the art to obtain the proper deflection properties for a given application. A further significant advantage of the caliper pin assembly of the present invention is the elimination of redundant screw and nut retention means employed in various previously known caliper pin assemblies. This results in significant reduction in the cost of the caliper pin assembly and in the complexity of part design and assembly.

The present caliper pin assembly also prevents rattling of the caliper between the two torque member arms 39. The pin can be installed in the receiving way under compression so as to maintain tight contact with the surface of the receiving way during expansion and contraction of the pins during vibration of the caliper and torque member and during actuation of the brake. In fact, the elastomeric material provides damping of any such caliper vibration. In addition, however, the caliper pin assembly is sufficiently compressible to permit the caliper to contact the torque member. Thus, brake torque passes directly from the caliper to the torque member bypassing the caliper pin assembly and extending its useful life.

Variations and modifications of the present invention are possible without departing from its scope and spirit as defined in the appended claims.

I claim:

1. A radially resilient caliper pin assembly having a longitudinal axis and being adapted to slidably mount a disc brake caliper to a torque member, said caliper pin assembly comprising:
    an elongate elastomeric core; and
    two substantially rigid, elongate shell members bonded to said elastomeric core substantially parallel to one another to form a split-shell case about said elastomeric core, each said shell member having a substantially flat upper surface portion and a longitudinal upper edge which is adjacent to the longitudinal upper edge of the other shell member and generally parallel to the longitudinal axis of said caliper pin assembly, said longitudinal upper edge of each said shell member forming axially spaced teeth, said teeth of each said longitudinal upper edge being intermeshed with said teeth of the other said longitudinal upper edge, and each said shell member having a substantially flat lower surface portion forming an obtuse inner angle with said upper surface portion.

2. The caliper pin assembly of claim 1 wherein each said shell member comprises a radially outward extending retention tab at each end of said shell member, each of which retention tabs provides an abutment surface facing the opposite end of said shell member, and each of which abutment surfaces is substantially orthogonal to the longitudinal axis of said caliper pin assembly.

3. The caliper pin assembly of claim 1 wherein said two shell members are of substantially identical configuration.

4. The caliper pin assembly of claim 1 characterized in that said caliper pin assembly is of substantially identical configuration as viewed in both directions along its longitudinal axis.

5. The caliper pin assembly of claim 1 wherein each said shell member comprises a radially outward extending retention tab at each end thereof, each of which retention tabs has an abutment surface facing the opposite end of said shell member, each of which abutment surfaces is substantially orthogonal to the longitudinal axis of said caliper pin assembly, said caliper pin assembly being characterized in that said shell members are substantially identical to one another and the configuration of said caliper pin assembly as viewed from either end along its longitudinal axis is substantially identical to the configuration as viewed from the other end.

6. A disc brake assembly comprising a rotor, a torque member positioned adjacent said rotor, a caliper, a friction element mounted by said caliper for engagement with said rotor upon actuation of said disc brake assembly, and a caliper pin assembly movably mounting said caliper to said torque member, wherein said torque member provides an open channel and said caliper provides an open channel facing that of said torque member and together therewith forms a non-circular way receiving said caliper pin assembly, said caliper pin assembly having a longitudinal axis and comprising:
    an elongate elastomeric core; and
    two substantially rigid elongate shell members bonded to said elastomeric core substantially parallel to one another to form a split-shell case about said elastomeric core, each said shell member having a substantially flat upper surface portion and a longitudinal upper edge which is adjacent to the longitudinal upper edge of the other shell member and generally parallel to the longitudinal axis of said caliper pin assembly, said longitudinal upper edge of each said shell member forming axially spaced teeth, said teeth of each said longitudinal upper edge being intermeshed with said teeth of the other said longitudinal upper edge, and each said shell member having a substantially flat lower surface portion forming an obtuse inner angle with said upper surface portion.

7. The disc brake assembly of claim 6 wherein each said shell member comprises a radially outward extending retention tab at each end of said shell member, each of which retention tabs provides an abutment surface facing the opposite end of said shell member, and each of which abutment surfaces is substantially orthogonal to the longitudinal axis of said caliper pin assembly.

8. The disc brake assembly of claim 6 wherein said two shell members are of substantially identical configuration.

9. The disc brake assembly of claim 6 characterized in that the configuration of said caliper pin assembly as viewed from either end along its longitudinal axis is substantially identical to its configuration as viewed from the other end.

10. The disc brake assembly of claim 6 wherein said caliper is mounted to said torque member by two said caliper pin assemblies and for each said caliper pin assembly each said shell member comprises a radially outward extending retention tab at each end thereof, each of which retention tabs has an abutment surface facing the opposite end of said shell member, each of which abutment surfaces is substantially orthogonal to the longitudinal axis of said caliper pin assembly, said caliper pin assembly being characterized in that said shell members are substantially identical to one another and the configuration of said caliper pin assembly as viewed from either end along its longitudinal axis is substantially identical to the configuration as viewed from the other end.

* * * * *